United States Patent [19]

Kikuchi

[11] Patent Number: 5,797,556
[45] Date of Patent: Aug. 25, 1998

[54] TAPE CARTRIDGE AND METHOD FOR PRODUCING SAME

[75] Inventor: Shuichi Kikuchi, Miyagi, Japan

[73] Assignee: Sony Corporation, Japan

[21] Appl. No.: 578,661

[22] PCT Filed: May 15, 1995

[86] PCT No.: PCT/JP95/00923

§ 371 Date: Mar. 13, 1996

§ 102(e) Date: Mar. 13, 1996

[87] PCT Pub. No.: WO95/31808

PCT Pub. Date: Nov. 23, 1995

[30] Foreign Application Priority Data

May 13, 1994 [JP] Japan .................. 6-100024

[51] Int. Cl.$^6$ .................................. G11B 23/087
[52] U.S. Cl. ................ 242/340; 242/342; 242/345; 242/347; 242/352.4; 29/434; 29/458
[58] Field of Search ............... 242/340, 342, 242/345, 346, 346.2, 347, 352.4; 29/434, 458; 360/130.21, 132

[56] References Cited

U.S. PATENT DOCUMENTS

| | | | |
|---|---|---|---|
| 4,696,087 | 9/1987 | Mizuta | 29/434 |
| 4,756,490 | 7/1988 | Newell | 242/347 |
| 5,097,374 | 3/1992 | Koizumi et al. | 242/342 |
| 5,330,051 | 7/1994 | Dangler et al. | 242/345 |
| 5,522,562 | 6/1996 | Stanley et al. | 242/342 |
| 5,588,606 | 12/1996 | Kikuchi et al. | 242/342 |

FOREIGN PATENT DOCUMENTS 63-122967  8/1988  Japan.

*Primary Examiner*—John P. Darling
*Attorney, Agent, or Firm*—Ronald P. Kananen

[57] ABSTRACT

A tape cartridge is provided with a cartridge case constituted by installing a cover on an upper surface of a base plate, a magnetic tape runningly installed in the cartridge case, and a drive belt for running the magnetic tape.

The base plate includes a hard protective coat layer at its upper and lower surface or either of upper and lower surfaces.

The base plate is formed by punching a base plate material sheet covered with the protective coat layer into a predetermined shape.

11 Claims, 15 Drawing Sheets

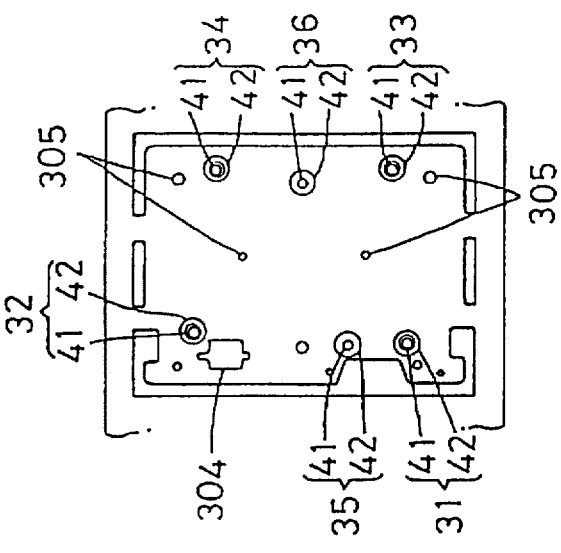
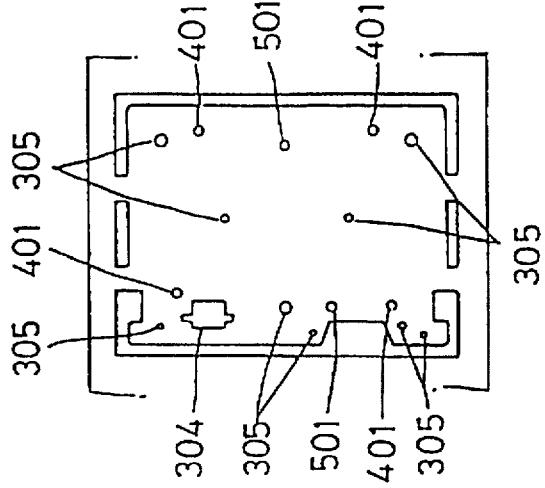
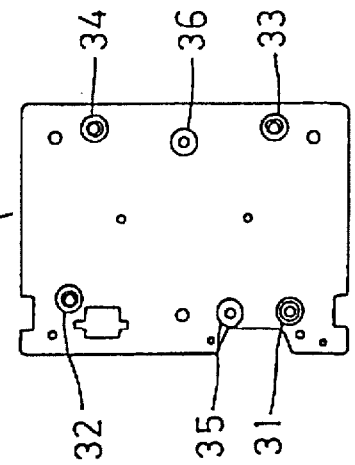
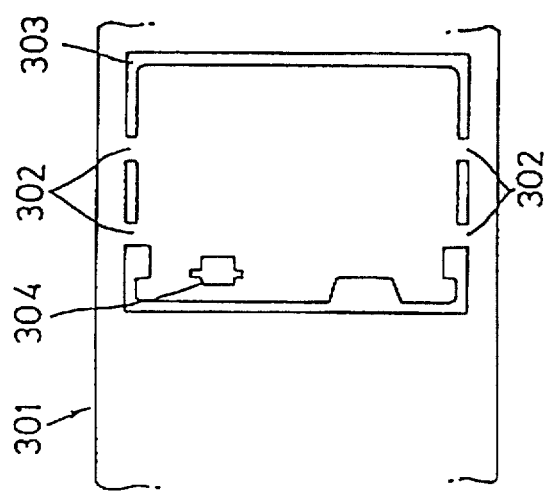
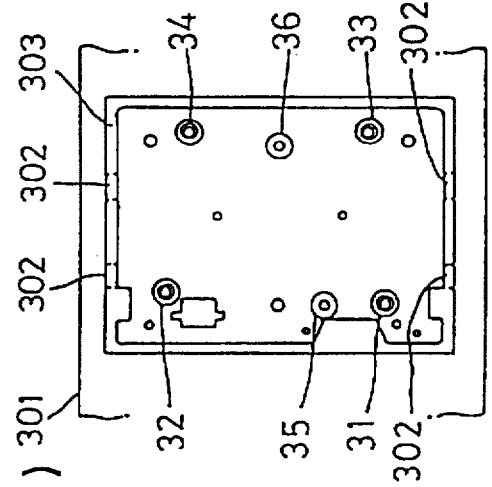

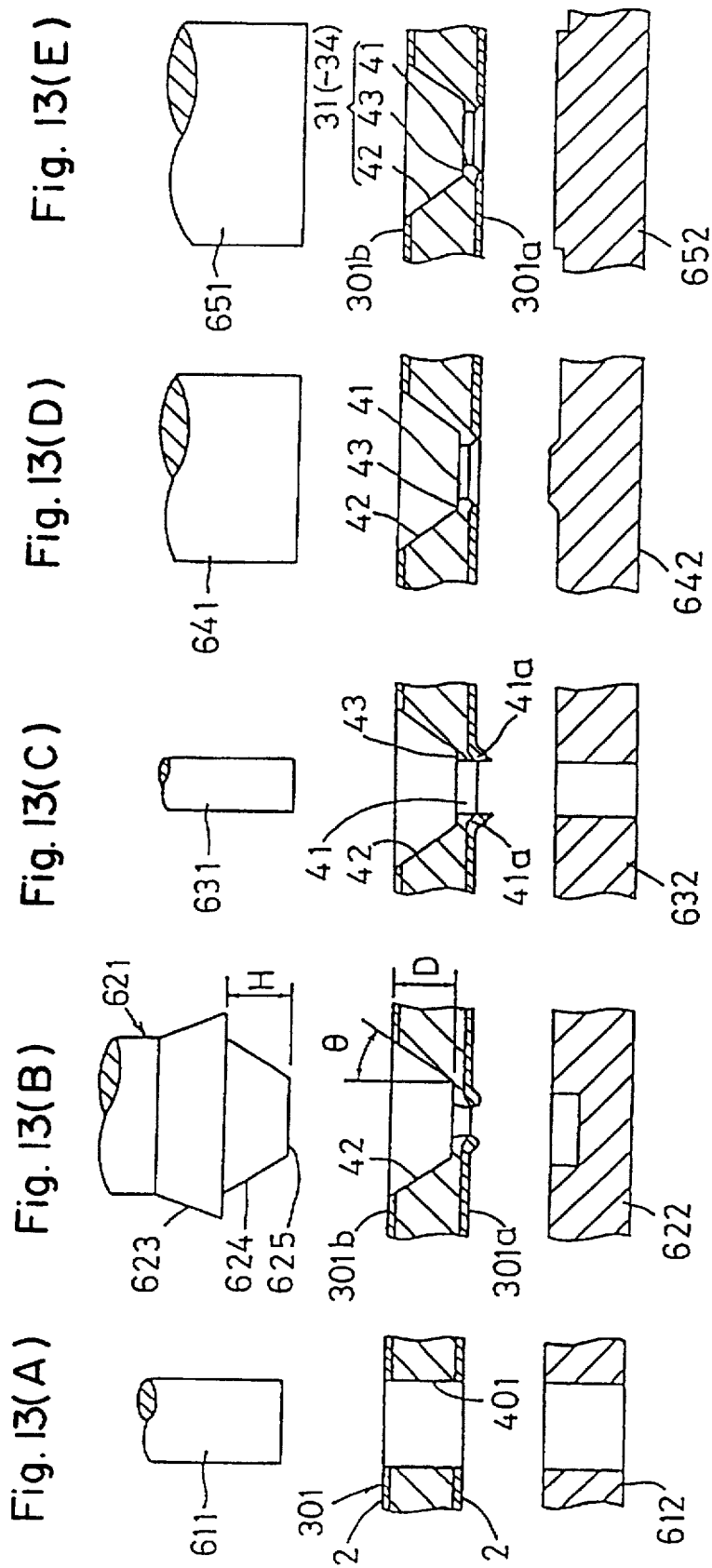

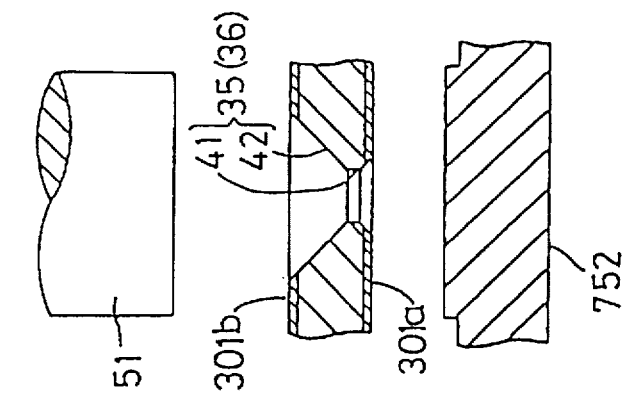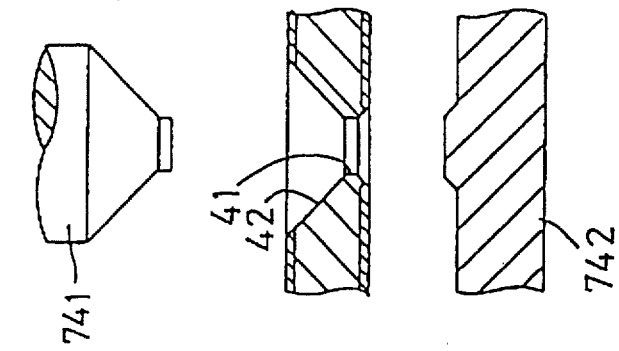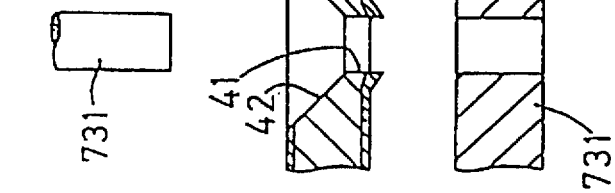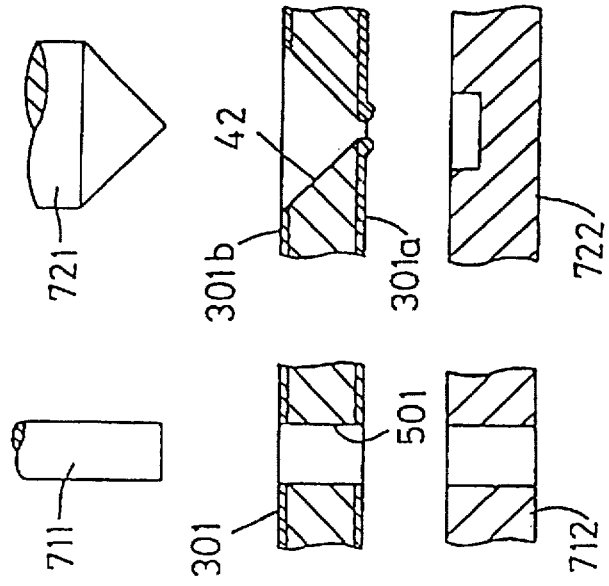

14
TAPE CARTRIDGE AND METHOD FOR PRODUCING SAME

TECHNICAL FIELD

The present invention relates to a tape cartridge, such as a data cartridge which is widely used as an external memory medium of a computer, and a method for producing the same.

BACKGROUND OF TECHNOLOGY

As shown in FIG. 15, a data cartridge, namely a tape cartridge 101 functioning as an external memory medium of a computer, comprises a cartridge case 104 constituted by installing a cover 103 at an upper surface of a base plate 102, a magnetic tape runningly installed in the cartridge case 104 and a drive belt 106 for running the magnetic tape 105.

As shown in FIG. 16, the base plate 102 is formed by installing a hard protective coat layer 112 on upper, lower and side surfaces of an aluminum plate 111.

The hard protective coat layer 112 is formed by treating an alumite-treatment on the aluminum plate 111.

As shown in FIG. 15, the cover 103 is made of a transparent synthetic resin. Grooves 103c and 103d for opening right and left side peripheral portions 102a and 102b of the base plate 102 are formed at right and left side surfaces 103a and 103b of the cover 103 with a predetermined length directing from a front surface 103e to a rear surface 103f.

A head inserted hole 103g is formed at one side portion of the front surface 103e of the cover 103, and a cutout window 103h for opening a first belt roller functioning as a drive roller mentioned hereinafter is formed at a center portion thereof.

As shown in FIG. 17, an end side of the magnetic tape 105 is wound around a first tape reel 121 and the other end side thereof is wound around a second reel tape 122.

The magnetic tape 105 is hooked on first and second tape guides 123 and 124 so as to run into the head inserted hole 103g formed at the front surface of the cover 103.

The drive belt 106 is hooked on a first roller 125 as a drive roller which is disposed to a front end 102a side of the base plate 102 so as to be directed to the cutout window 103h formed at the center portion of the front surface 103e of the cover 103, and second and third belt roller 126 and 127 functioning as corner rollers which are disposed at both side portions of the rear end 102b of the base plate 102, so as to generally form a triangle shape as flatly viewed.

The drive belt 106 between the first belt roller 125 and the second belt roller 126 is pressfitted on an outer surface of the magnetic tape 105 wound around the first tape reel 121, and the drive belt 106 between the first belt roller 125 and the third belt roller 127 is pressfitted on an outer surface of the magnetic tape 105 wound around the second tape reel 122.

The conventional tape cartridge 101 constituted as mentioned above is used in a recording and reproducing apparatus upon installed therein.

As shown in FIG. 15, a recording and reproducing apparatus 201 includes cartridge-insert guiding portions 203 and 204 of a U-shaped groove at right and left side portions of a cartridge inserting port 202.

Inserting the conventional tape cartridge 101 to the recording and reproducing apparatus 201, the right and left side peripheral portions 102a and 102b of the base plate 102 of the tape cartridge 101 are engaged with the cartridge insert guiding portions 203 and 204 of the recording and reproducing apparatus 201, and the tape cartridge 101 is inserted to a predetermined position of the recording and reproducing apparatus 201 while being guided by the cartridge insert guiding portions 203 and 204.

Inserting the tape cartridge 101 to the predetermined position (a loading position) of the recording and reproducing apparatus 201, as shown in FIG. 18, the loading of the tape cartridge 101 is detected by a cartridge detecting sensor 211 installed in the recording and reproducing apparatus 201, and a magnetic head 212 of the recording and reproducing apparatus 201 is contacted with the magnetic tape 105 upon entering in the head inserted hole 103g of the tape cartridge 101. Also, a drive capstan roller 213 is contacted with the first belt roller 125 functioning as a drive roller of the tape cartridge 101.

By rotating the drive capstan roller 213, the first belt roller 125 is rotated, and the drive belt 106 and the magnetic tape 105 are run by the rotation of the first belt roller 125, so that the recording and reproducing to the magnetic tape 105 is executed by the magnetic head 212.

Next, the producing method of the conventional tape cartridge 101 will be explained.

First, an original base plate is formed by punching an aluminum-alloy material roll into a predetermined shape.

Next, the alumite-treatment is applied to the original base plate by dipping it in sulfuric acid or oxalic acid solution.

The alumite-treated original base plate obtained by dipping in sulfuric acid or oxalic acid solution forms a hard protective coat layer (oxide layer) on its all surface and thereby becomes a base plate.

The first and second tape reels and tape guides and first to third belt rollers are assembled on an upper surface of the base plated to which the hard protective coat layer is coated. The drive belt is hooked on the first to third belt rollers, and the magnetic tape is wound around the first and second tape reels.

As mentioned above, the conventional tape cartridge is produced by assembling a cover on the base plate so as to cover the magnetic tape and the drive belt after the magnetic tape and the drive belt are assembled to the base plate.

By the way, the conventional tape cartridge and its producing method have the following problems.

(1) In the producing method of the conventional tape cartridge, the original base plate is formed by punching an aluminum-alloy base plate material-sheet into a predetermined shape, and an oxide layer functioning as a protective coat layer is coated by the alumite treatment by dipping the original base plate in sulfuric acid or oxalic acid solution. Therefore, it is necessary to execute the alumite treatment to every original base plate. This complicates the alumite treatment process and raises a cost of the base plate.

(2) Due to the high cost of the base plate, the tape cartridge produced by the above-mentioned method necessarily raises its total cost.

Also, in the conventional tape cartridge, the hard protective coat layer 112 is formed on side surfaces of the base plate 102 in addition to the upper and lower surfaces of the base plate 102.

Accordingly, as shown in FIG. 18, there is a problem that the hard protective coat layer 112 formed on the side peripheral portions 102a and 102b are in contact with the inner side surfaces of the cartridge insert guiding portions 203 and 204, and the inner side surfaces are injured when the right and left side peripheral portions 102a and 102b of the base plate 102 are engaged with and slid along the cartridge insert guiding portions 203 and 204 of the recording and reproducing apparatus 201.

The present invention aims to solve the above-mentioned conventional problems.

DISCLOSURE OF INVENTION

A producing method of the tape cartridge which executes a driving of tape by a drive belt, the producing method of a tape cartridge according to the present invention comprising the steps of:

a step for forming a hard protective coat layer on a surface of a base plate material sheet;

a step for punching the hard protective coat layer formed base plate material sheet into a predetermined shape of a base plate and forming a hole at a predetermined position on the base plate;

a step for embedding a plurality of tape guides, roller shafts rotatably supporting a plurality of belt rollers, and reel shafts rotatably supporting a pair of tape reels on the base plate;

a step for installing belt rollers to the roller shafts, the pair of tape reels to the reel shafts, a tape to the tape reels and a drive belt to the belt rollers; and a step for installing a cover to the base plate and screwing down the cover on the base plate through the holes.

Also, the tape cartridge according to the present invention being arranged so that a tape wound around a pair of tape reels is frictionally run by a drive belt, the tape cartridge comprising:

a base plate punched in to a predetermined shape from a plate aluminum-alloy material whose surface is coated by a hard protective coat layer;

a pair of tape reels rotatably supported to a pair of reel shafts embedded on the base plate, a magnetic tape being wound around the pair of tape reels and being run between the pair of tape reels upon being runningly guided by a plurality of tape guides embedded on the base plate;

a drive belt runningly guided by a plurality of belt rollers rotatably supported to a plurality of roller shafts embedded on the base plate and frictionally driving the magnetic tape wound around the pair of tape reels;

a cover installed to the base plate so as to cover the magnetic tape on the base plate; and a cap portion disposed at the cover to open and close a head inserted hole so that the magnetic head is contactable with the magnetic tape runningly guided by the tape guide.

In the producing method of the tape cartridge and the tape cartridge according to the present invention, as mentioned above, since the base plate is formed by punching the base plate material sheet into a predetermined shape after the base plate material sheet is coated by the hard protective coat layer, the base plate is in a condition that the hard protective coat layer is already formed at a time that the base plate material sheet is punched. Accordingly, it is possible to eliminate a complicated step that a hard protective coat layer is formed to each base plate after punching the base plate material sheet. This improves a produtivity of the base plate and the tape cartridge.

Also, since the tape cartridge according to the present invention is arranged so that a hard protective coat layer is not formed on side surfaces of the base plate, it is possible to prevent side surfaces of a cartridge inserting portion of a drive system from being injured by the hard protective coat layer of the side surfaces of the base plate when it is inserted into the drive system as the conventional tape cartridge is done.

BRIEF EXPLANATION OF DRAWINGS

FIGS. 8(A)–(E) are production process diagrams of the base plate.

FIGS. 13(A)–(E) are press forming process diagrams of the tack-pin receiving hole.

FIGS. 14(A)–(E) are press forming process diagrams of the screw receiving hole.

PREFERRED EMBODIMENT FOR EXECUTING INVENTION

Next, the present invention will be explained with reference to FIG. 1 to FIG. 14.

Figure 1:
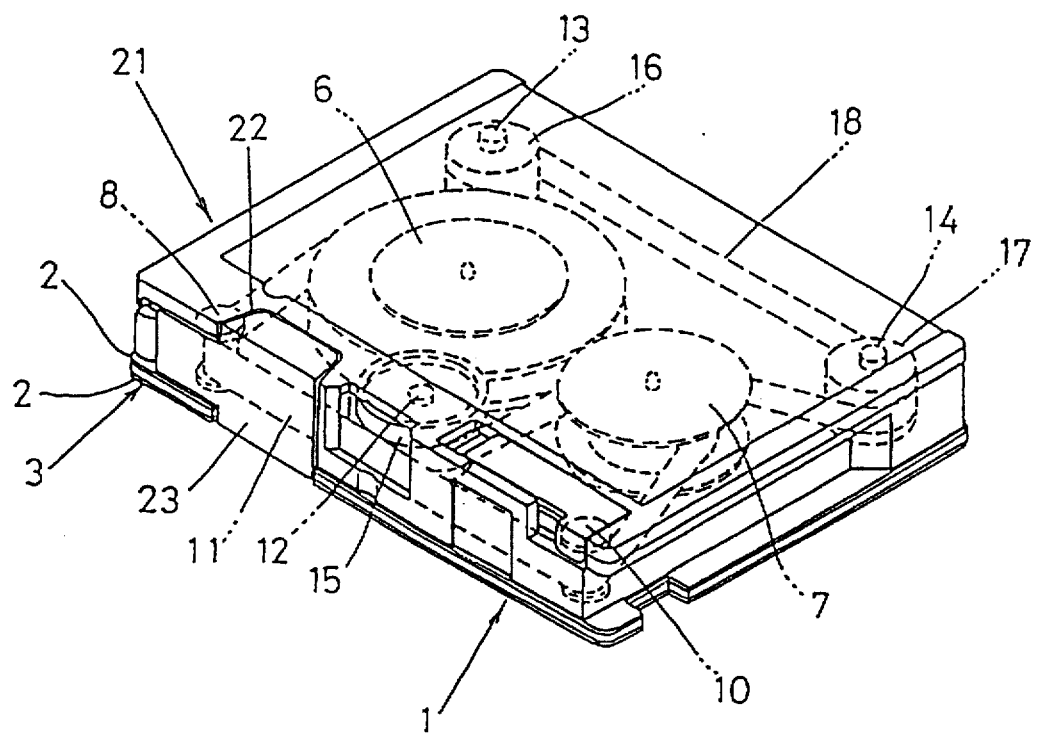
FIG. 1 is a perspective view of a tape cartridge.
Figure 2:
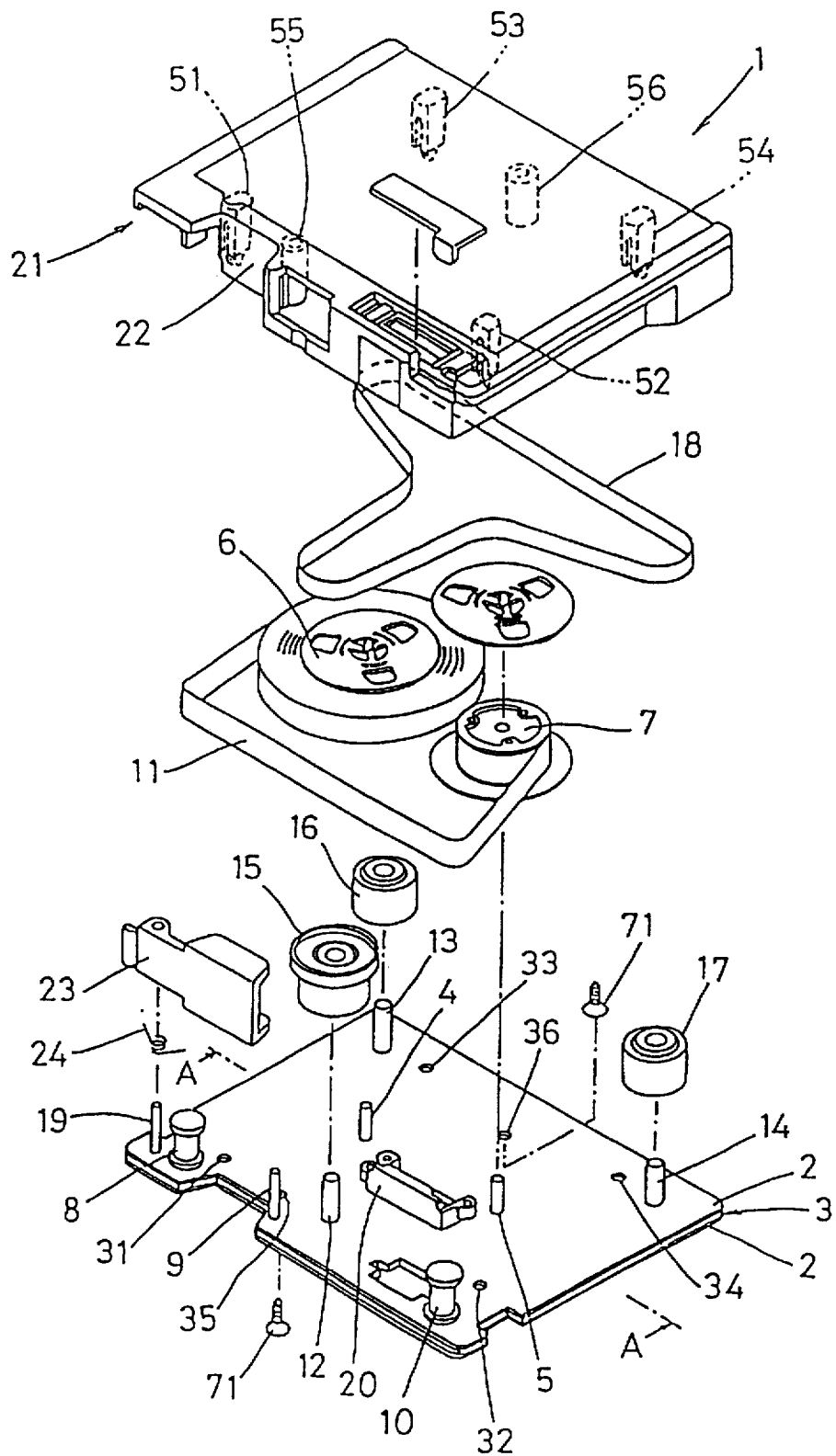
FIG. 2 is an exploded perspective view of the tape cartridge.

FIG. 1 and FIG. 2 are a perspective view and an exploded perspective view of a tape cartridge in which a magnetic tape wound around a pair of tape reels is frictionally run by a drive belt.

The tape cartridge 1 comprises a base plate 3 which is punched into a predetermined shape from a plate-shape aluminum-alloy material sheet whose surface is coated by a hard protective coat layer 2; a pair of tape reels 6 and 7 which are rotatably supported by a pair of reel shafts 4 and 5 embedded on the base plate 3; a magnetic tape 11 which is wound around the pair of tape reels 6 and 7 and which is runningly guided by a plurality of tape guides 8, 9 and 10 embedded on the base plate 3 and runs between the pair of tape reels; a drive belt 18 which is runningly guided by first, second and third belt rollers 15, 16 and 17 which are rotatably supported by first, second and third roller shafts 12, 13 and 14 embedded on the base plate 3 and which frictionally drives the magnetic tape 11 wound around the pair of tape reels 6 and 7; a cover 21 which is installed to the base plate 3 so as to cover the magnetic tape 11 on the base plate 3; and a cap portion 23 which is disposed to open and close the head inserted hole 22 disposed at the cover 21 so that a magnetic head is connectable with the magnetic tape 11 runningly guided by the tape guides 8, 9 and 10.

Figure 3:
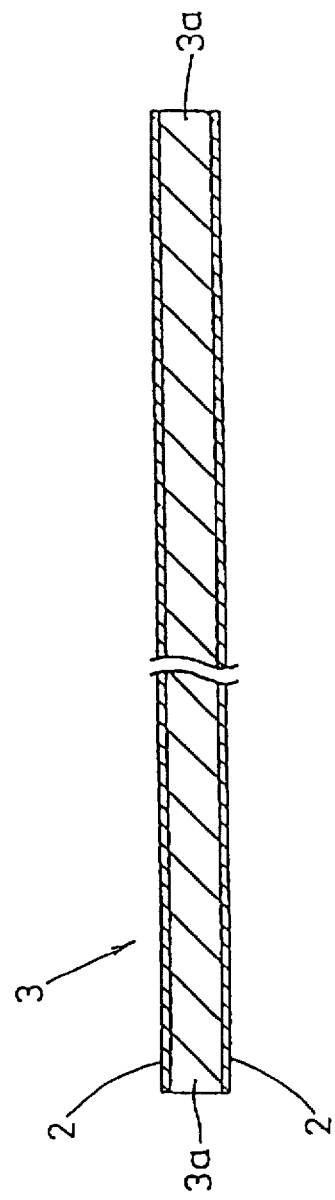
FIG. 3 is a cross-sectional view of a base plate.

As shown in FIG. 3, the base plate 3 includes the hard protective coat layer 2 at its upper and lower surfaces, and a cut surface 3a generated when the aluminum-alloy material sheet is punched out is bared at side surfaces.

The hard protective coat layer 2 is formed by executing the alumite treatment (anodic treatment) or coating synthetic resin.

The reel shafts 4 and 5, the tape guides 8, 9 and 10 and roller shafts 12, 13 and 14 are embedded in the plurality of imbedding holes formed in the base plate 3.

As shown in FIG. 2, first to fourth tack-pin receiving holes 31 to 34 for installing the cover 21 are formed in the vicinity of the four corners of the base plate 3. A first screw receiving hole 35 is formed between the first and second tack-pin receiving holes 31 and 32, and a second screw receiving hole 36 is formed between the third and fourth tack-pin receiving holes 33 and 34.

The plurality of embedding holes are formed in circular, so that the end portions of the reel shafts 4 and 5, the tape guides 8, 9 and 10 and the roller shafts 12, 13 and 14 are embedded into the holes by being pressfitted therein.

Figure 4:
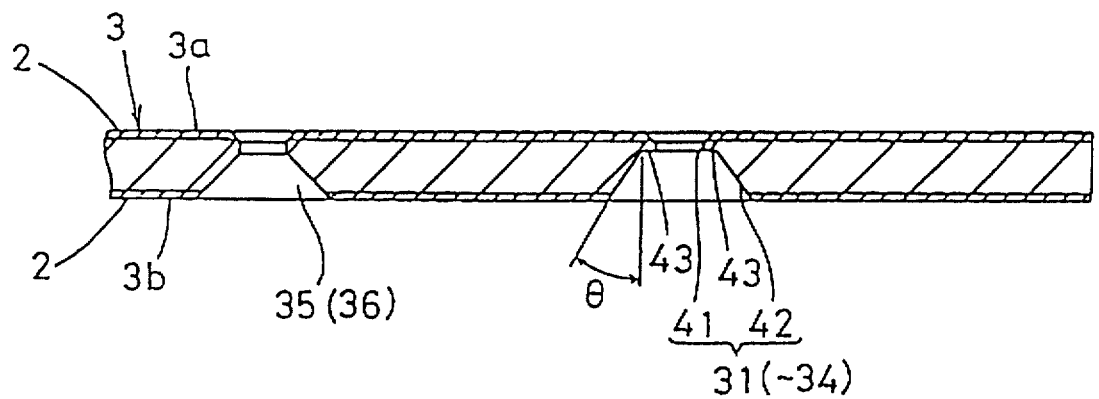
FIG. 4 is a cross-sectional view of a tack-pin receiving hole and a screw receiving hole.

As shown in FIG. 4, the first to fourth tack-pin receiving hole 31 to 34 are constituted by a small hole portion 41 which is open toward the upper surface 3a of the base plate 3, a large hole portion 42 which is communicated with the small hole portion 41 and open toward the lower surface 3b of the base plate 3.

The large hole portion 42 is formed into a truncated cone shape and is arranged to be communicated with the small hole portion 41 through a ring-shaped loose-proofing surface (pin connection surface) 43.

The first and second screw receiving holes 35 and 36 are formed into a truncated cone shape where the upper surface 3a side of the base plate 3 is formed small and the lower surface 3b side is formed large.

As shown in FIG. 2, the cover 21 is formed into a shape corresponding to the base plate 3 by plastic. The first to fourth tack pins 51 to 54 are formed at positions corresponding to the first to fourth tack-pin receiving holes 31 to 34, and boss portions 55 to 56 for screwing the first and second screws are formed at positions corresponding to the first and second screw receiving holes 35 to 36.

Figure 5:
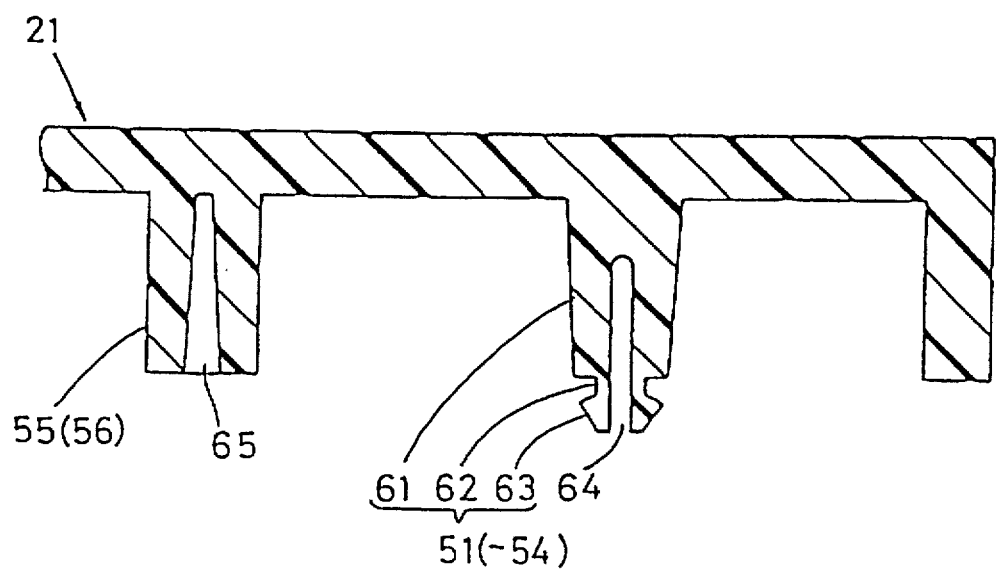
FIG. 5 is a cross-sectional view of a tack pin and a boss portion for inserting a screw.

As shown in FIG. 5, each of the first to fourth tack pins 51 to 54 is constituted by a large-size shaft portion 61 whose diameter is larger than that of the small hole portion 41 of the first to fourth tack-pin receiving holes 31 to 34, a small-size shaft portion which is connected to a tip end of the large-size shaft portion 61 and whose diameter is smaller than that of the small-size hole portion 41, and a flange portion 63 for a loose-proof which is connected with a tip end of the large-size shaft portion 62 and whose diameter is larger than that of the small-size hole portion 41. The flange portion 63, the small-size shaft portion and a part of the large-size shaft portion 61 are respectively divided into two part along the axial direction by means of a slit 64 and are formed into a so-called cotter pin shape.

The boss portions 55 and 56 for screwing the first and second screws are formed into a large-size shaft shape whose diameter is larger than that of the first and second screw receiving holes 35 and 36, and a screw connected hole 65 is formed at its center portion.

Figure 6:
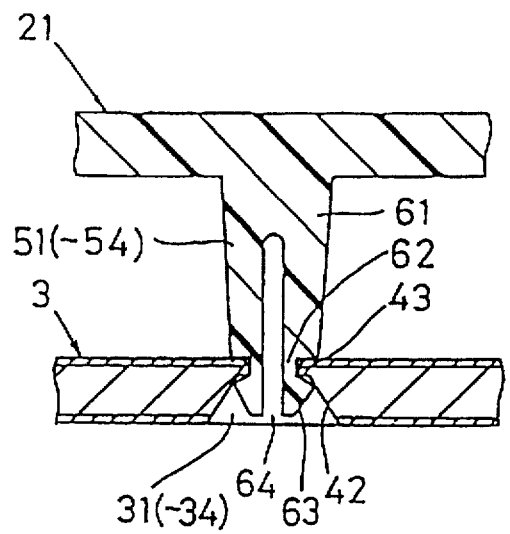
FIG. 6 is a cross-sectional view of a temporary fixed condition.

By fixing the cover 21 on the base plate 3, adjusting the first to fourth tack pins 51 to 54 with the position of the first to fourth tack-pin receiving holes 31 to 34, and pressfitting the cover 21 toward the base plate 3 side, the first to fourth tack pins 51 to 54 decrease their diameters due to the existence of the slit 64. Then, as shown in FIG. 6, the small-size shaft portion 62 is inserted into the small-size hole portion 21 of the first to fourth tack-pin receiving portion 31 to 34, and the flange portion 63 is inserted into the large hole portion 42.

The flange portion 63 inserted into the large hole portion 42 is expanded in diameter by the recovery force of the cotter pin and is connected to the loose-proofing surface 43 so that the loosening from the tack-pin receiving holes 31 to 34 is prevented, and the base plate 3 is clamped between the flange portion 63 and a tape end surface of the large-size shaft portion 61 to tack the cover 21 on the base plate 3.

Figure 7:
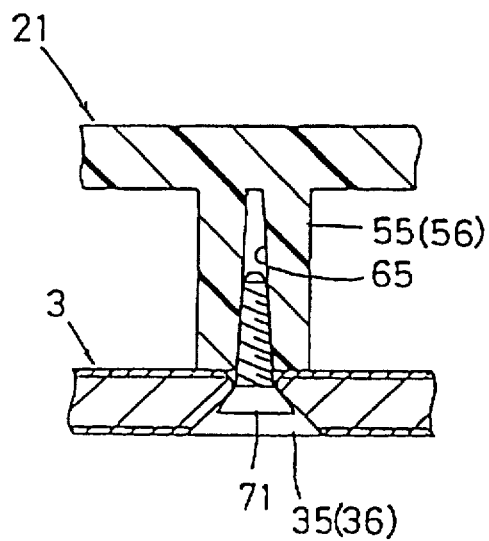
FIG. 7 is a cross-sectional view of a screwed condition.

Then, as shown in FIG. 7, by screwing a screw 71 to the screw hole of the boss portions 55 and 56 for inserting the screw through the first and second screw receiving holes 35 and 36, the cover 21 is fixingly installed on the base plate 3.

Next, a producing method of the cartridge tape which executes a driving of a magnetic tape by the drive belt will be explained.

The producing method according to the present invention comprises a step for forming a hard protective coat layer on a surface of the base plate material sheet; a step for punching the hard protective coat layer from the base plate material sheet into a predetermined shape of the base plate and forming a hole at a predetermined position on the base plate; a step for embedding a plurality of tape guides, roller shafts rotatably supporting a plurality of belt rollers, and reel shafts rotatably supporting a pair of tape reels on the base plate; a step for installing belt rollers to the roller shafts, the pair of tape reels to the reel shafts, a tape to the tape reels and a drive belt to the belt rollers; and a step for installing a cover on the base plate and screwing down the cover on the base plate through the holes.

Next, each step will be explained.

The step for forming the hard protective coat layer on the surface of the base plate material sheet is executed by applying the alumite-treatment on the surface of the base plate material sheet or by coating synthetic resin thereon.

The alumite treatment is executed by flowing electric current to the aluminum-alloy base plate material sheet as an anode in sulfuric acid or oxalic acid solution.

For example, by cleaning the aluminum-alloy base plate material sheet, dipping it in sulfuric acid or oxalic acid solution and applying electric current of 2 to 3 A/cm² and direct current voltage 70 V for about 40 to 50 minutes, an oxide layer of about 15 to 20 µm thickness is obtained. This oxide layer is used as a hard protective coat layer.

The coating treatment is executed by coating synthetic-resin coating material on the surface of the base plate material sheet.

For example, epoxy resin coating material of 10 µm thickness is coated on the base-plate material 301 through a 280 mesh screen plate in a manner of silk screen printing method. Then, the coated material is baked at 150° C. for 30 minutes. As a result, the surface hardness of the protective covering layer became larger than 2H. Also, coating material including silicone compound is coated to 5 µm thickness on the base-plate material 301 by a roll coat method. Then, the coated material is baked at 240° C. for 5 minutes. As a result, the surface hardness of the protective covering layer became larger than 3H.

Next, steps for punching and opening holes to the base plate material sheet coated by the hard protective coat layer will be explained.

As shown in A of FIG. 8, a base plate outline punched portion 303 is continuously punched while a non-punched portion 302 is remained in the base plate material sheet 301 whose surface is formed by the hard protective coat layer, and a window portion 304 for mirror is punched.

Next, as shown in B of FIG. 8, prepared holes 401, 401 for forming the tack-pin receiving holes, prepared holes 501, 501 for forming screw receiving holes, embedding holes 305, 305 for embedding the reel shafts 4 and 5, the tape guides 8, 9 and 10 and the roller shafts 12, 13 and 14 are punched.

Next, as shown in C of FIG. 8, by applying a press-working or drilling for forming tack-pin receiving holes, which working will be mentioned later, the first to fourth tack-pin receiving holes 31 to 34 are formed.

On the other hand, the first and second screw receiving holes 35 and 36 are formed by applying a press-working or drilling for forming screw receiving hole as mentioned later to the prepared holes 501, 501.

After the tack-pin receiving holes 31 to 34 and the receiving holes 35 and 36 are formed as mentioned above, the base plate 3 is formed by cuttingly removing the non-punched portions 302 and by separating an inner side of the outline punched portion 303 from the base plate material sheet 301 as shown in D and E of FIG. 8.

Next, assembly steps of the magnetic tape and the drive belt to the base plate 3, which is punched into a predetermined shape and forms holes as mentioned above, are executed as follows.

Figure 9:
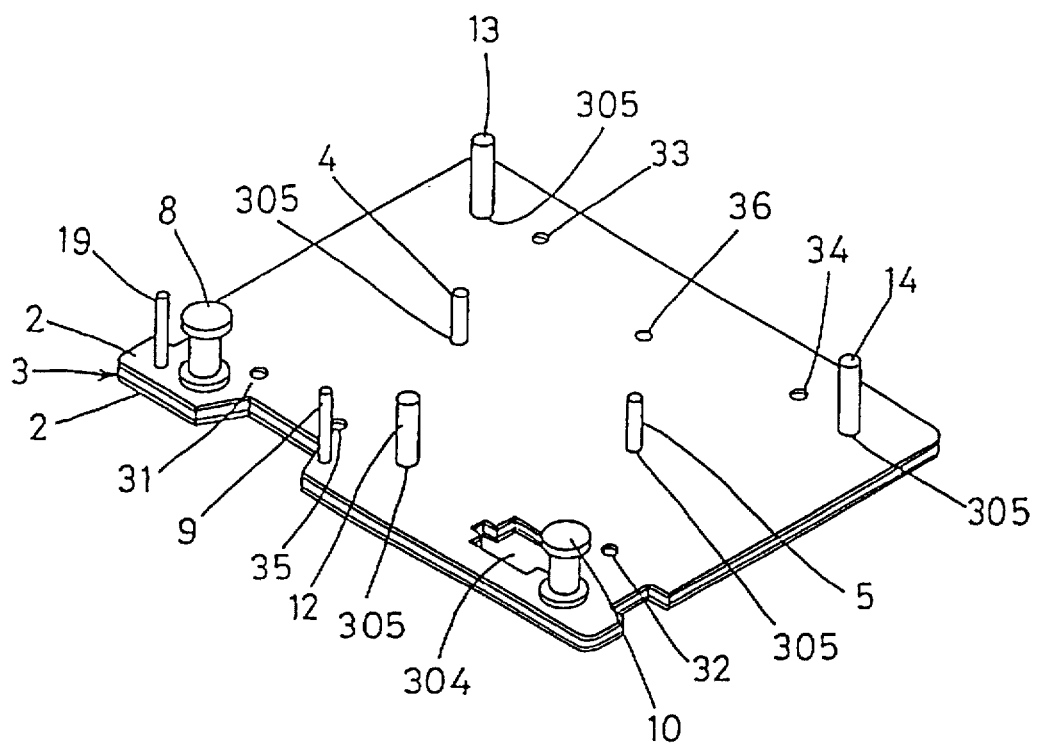
FIG. 9 to FIG. 12 are assembly process diagrams of the tape cartridge.

As shown in FIG. 9, by utilizing the embedded holes 305, 305 formed in the base plate 3, the reel shafts 4 and 5, the tape guides 8, 9 and 10, the roller shafts 12, 13 and 14, and a cap support shaft 19 are embedded to the base plate 3.

Figure 10:
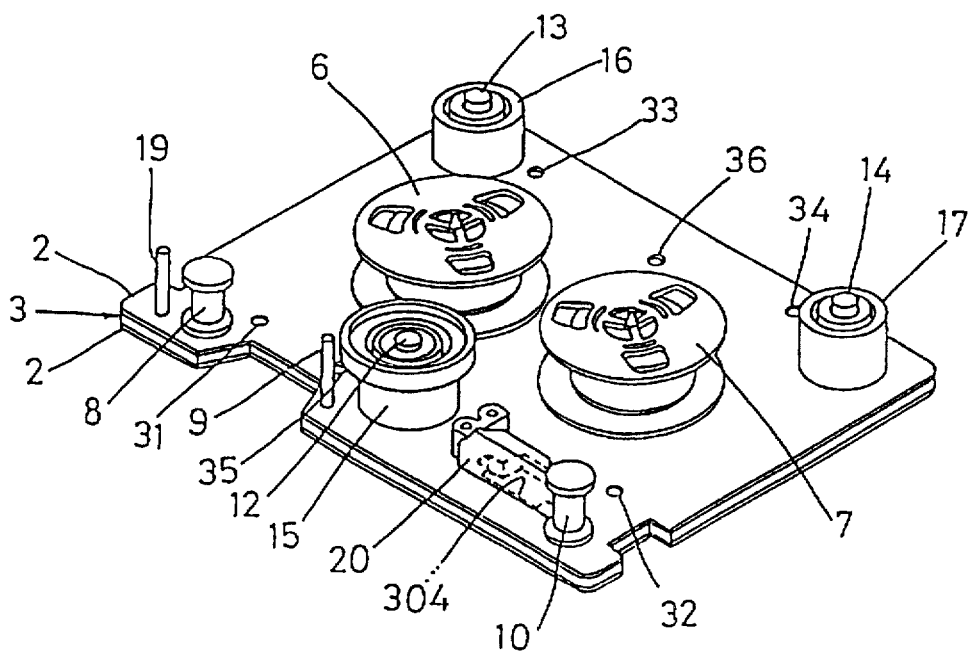

Next, as shown in FIG. 10, the pair of tape reels 6 and 7 are assembled to the reel shafts 4 and 5, the first to third belt roller 15, 16 and 17 are assembled to the first, second and third roller shafts 12, 13 and 14, and a mirror 20 for detecting a tape end is assembled so as to confront to the window portion 304.

Figure 11:
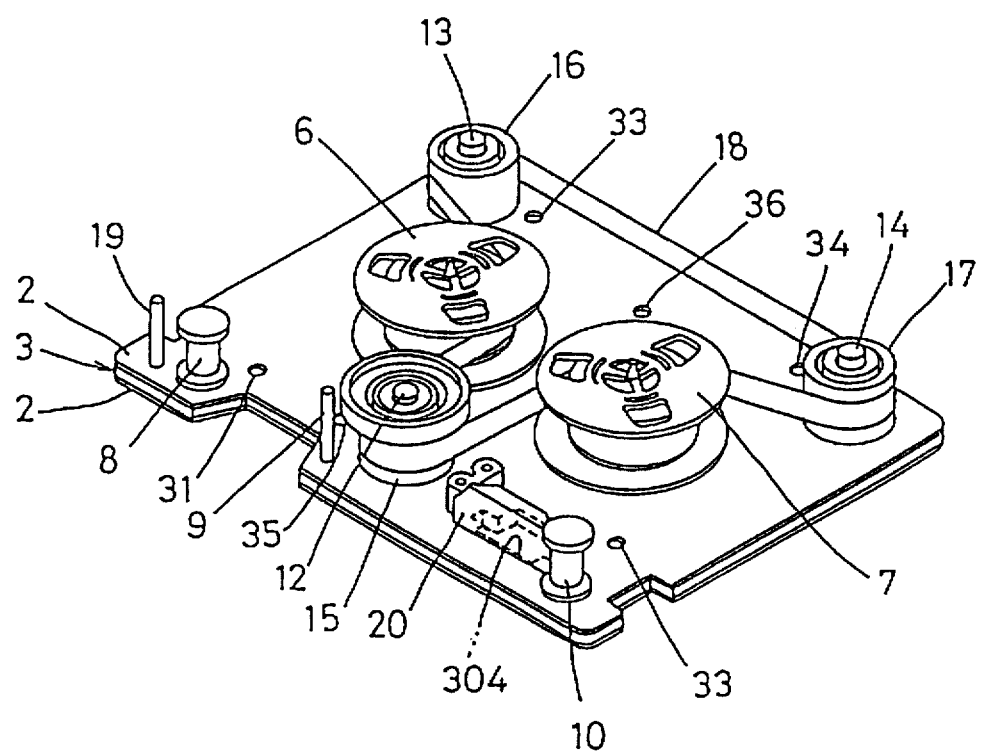

Next, as shown in FIG. 11, the drive belt 18 is hooked on the first to third belt rollers 15, 16 and 17.

The drive belt 18 located between the first belt roller (drive roller) 15 and the second belt roller 16 is pressfitted on the outer surface of the tape reel 6, and the drive belt 18 located between the first belt roller 15 and the third belt roller 17 are pressfitted on the outer surface of the other tape reel 7.

The magnetic tape 11 is wound around the tape reels 6 and 7 by driving the drive belt 18.

Figure 12:
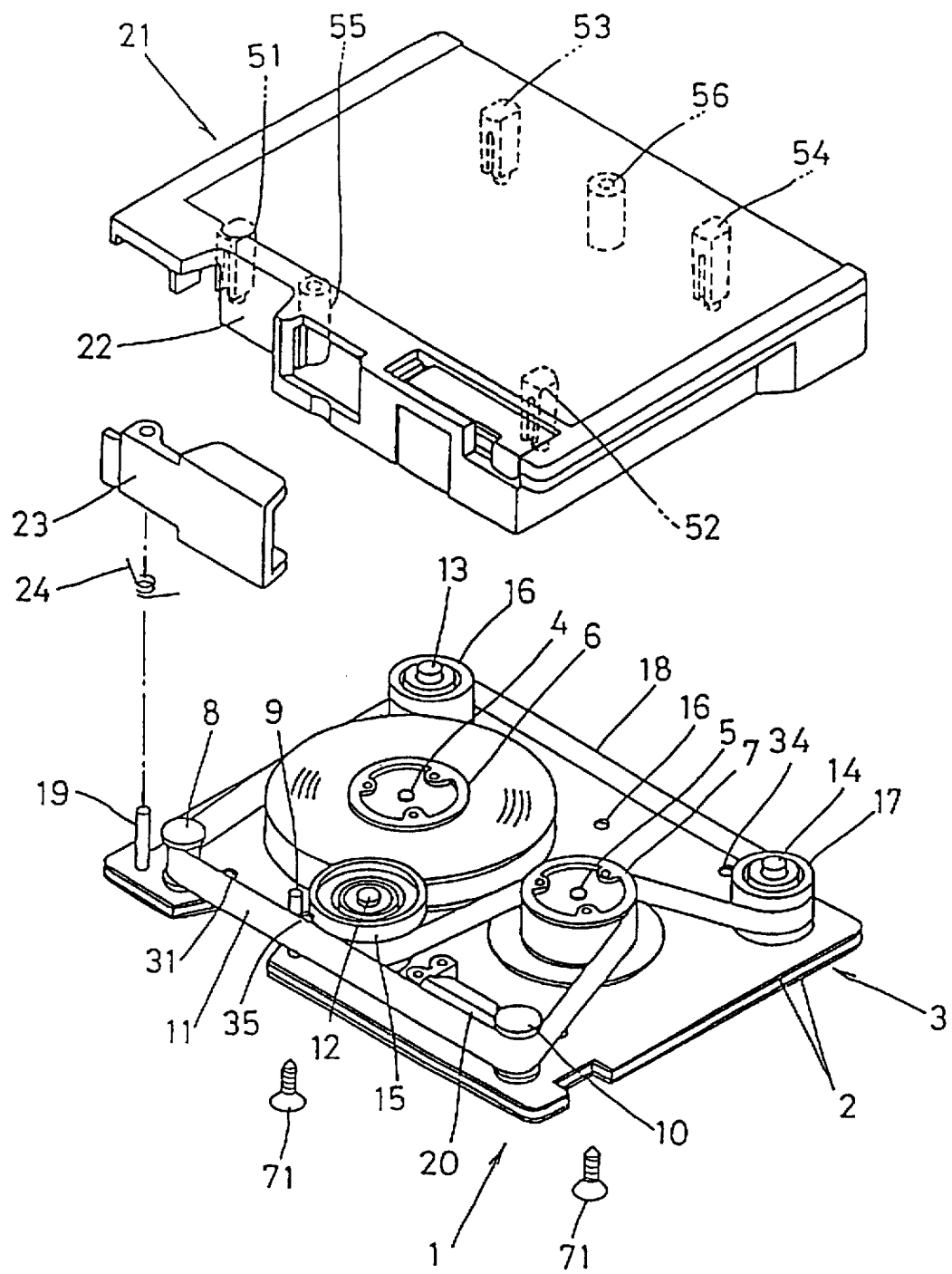
Figure 15:
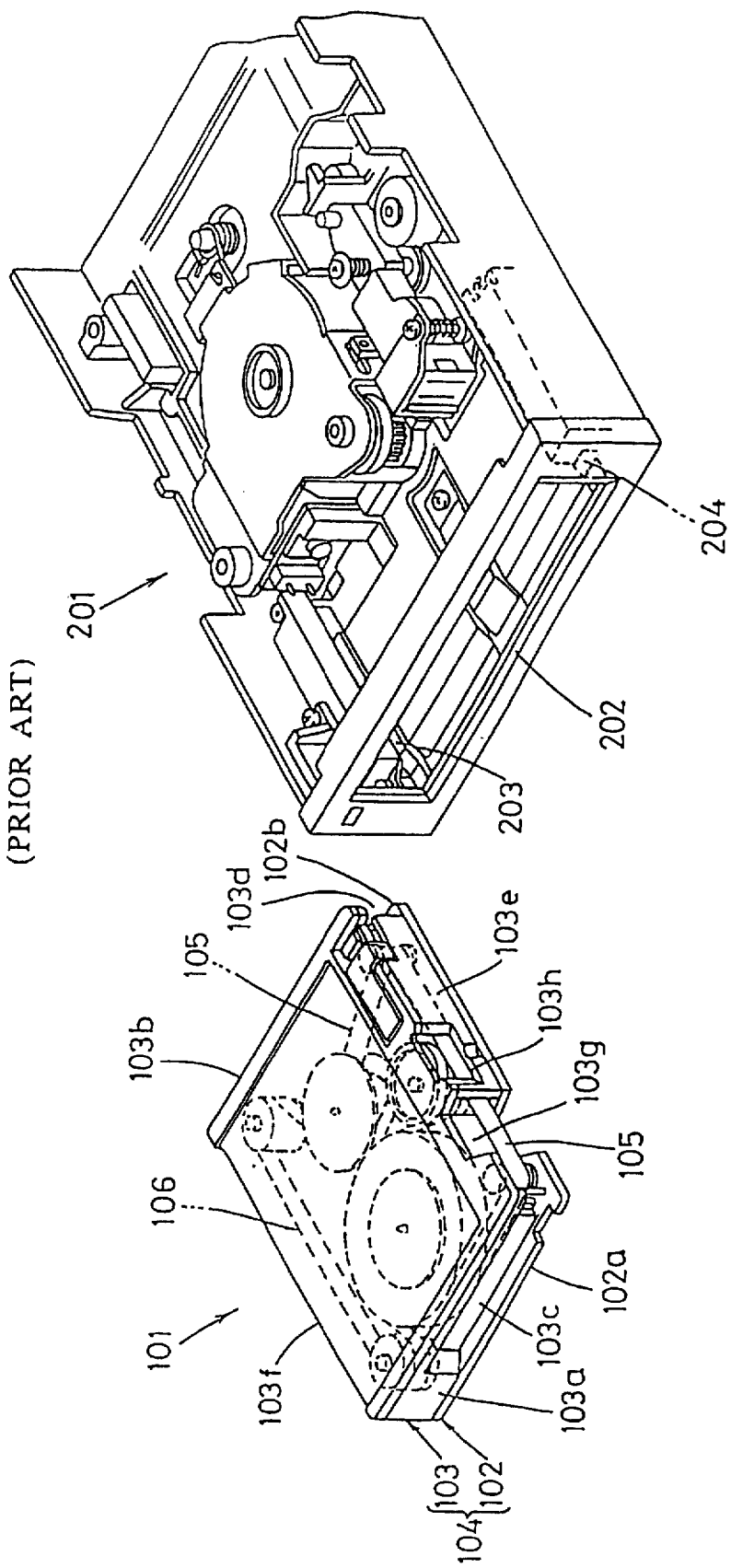
FIG. 15 is a perspective view of a conventional example.
Figure 16:
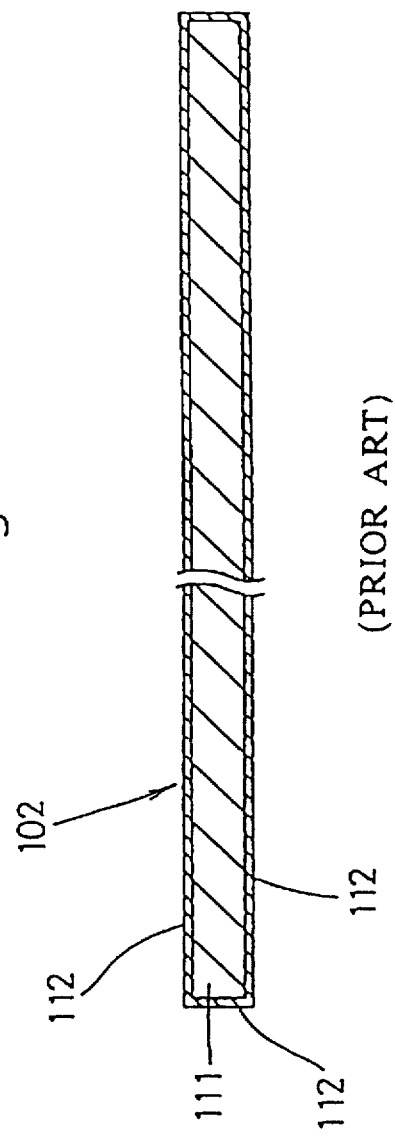
FIG. 16 is a cross-sectional view of a base plate.
Figure 17:
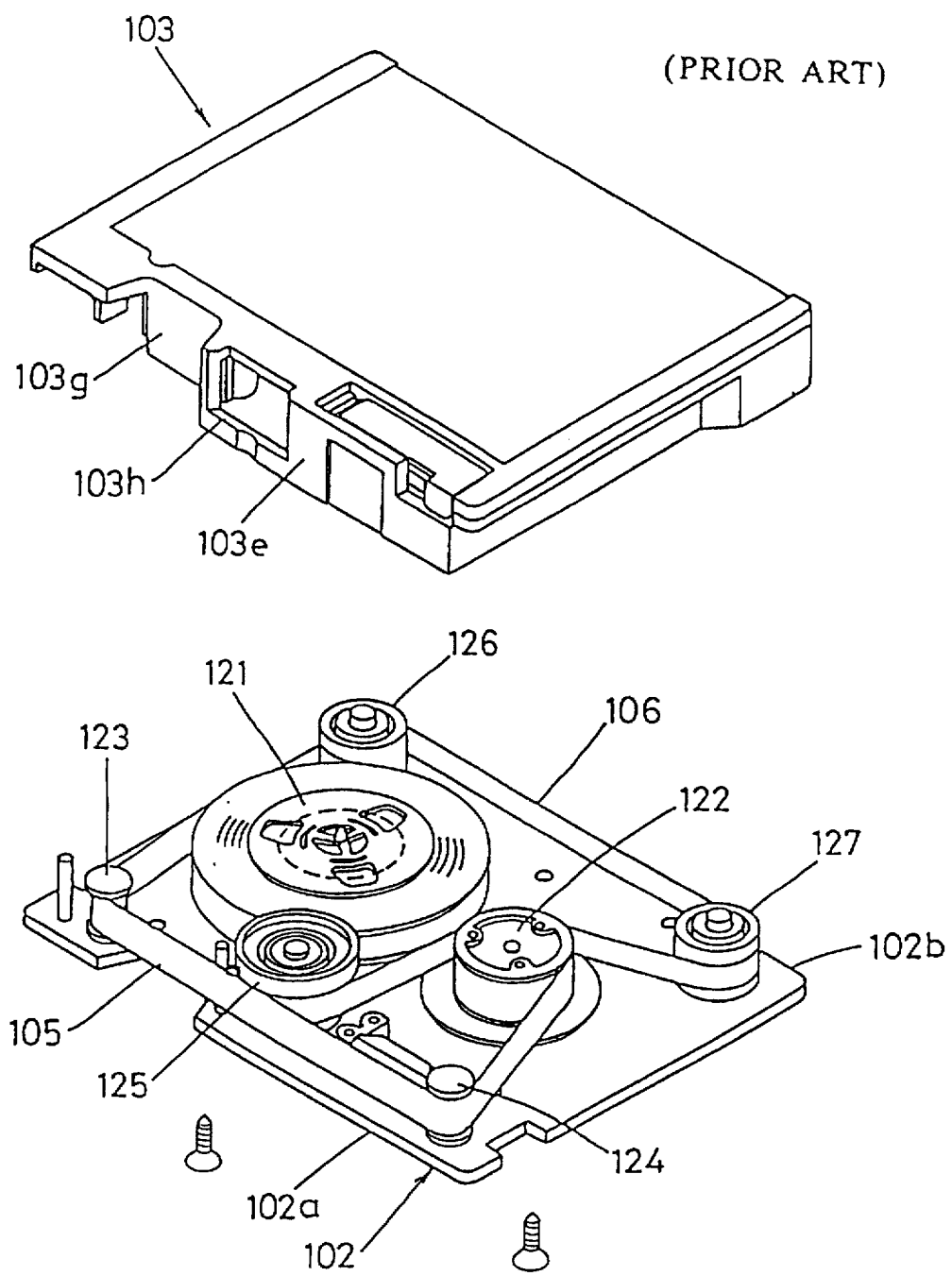
FIG. 17 is an exploded perspective view.
Figure 18:
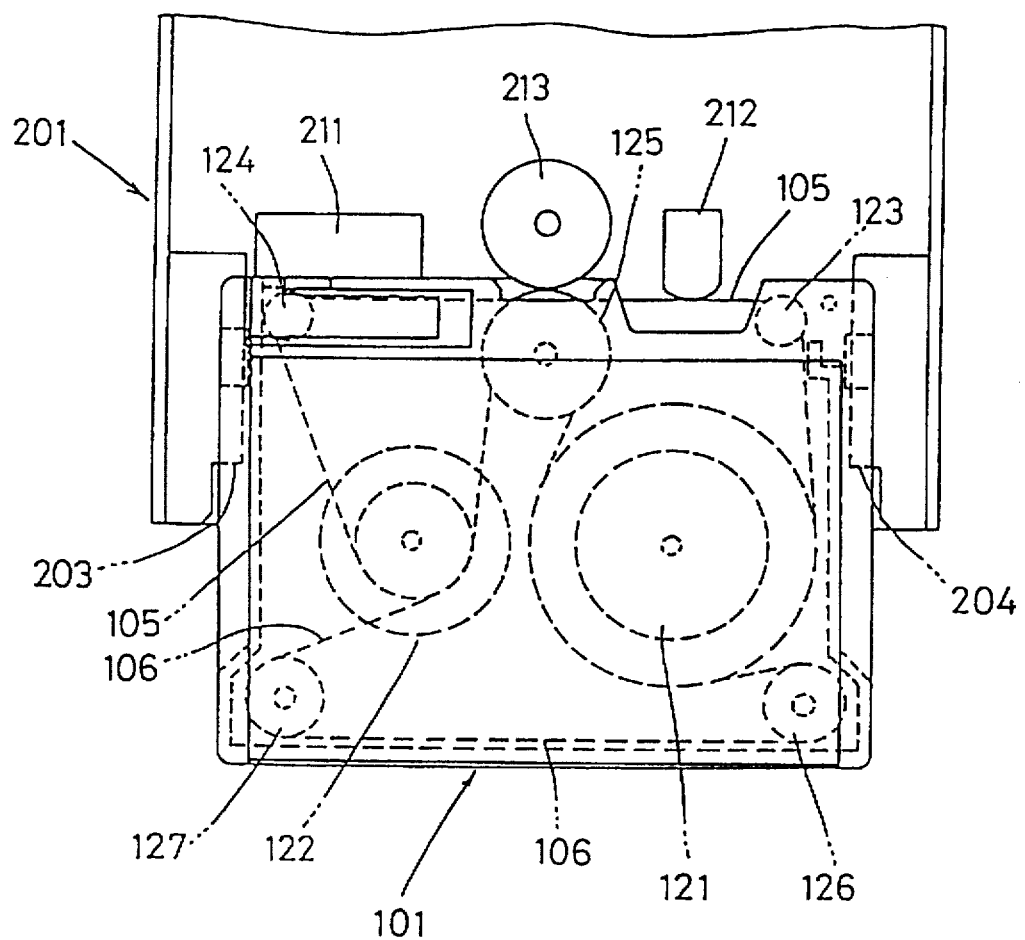
FIG. 18 is a plan view in a condition that it is loaded in a recording and reproducing apparatus.

Next, as shown in FIG. 12, the tape cartridge 1 is formed by assembling the cap portion 23 and a spring 24 for setting so as to close the cap portion 23 are assembled to the cap support shaft 19 and by assembling the cover 21 on the base plate 3.

The assembly of the cover 21 to the base plate 3 is executed by inserting the first to fourth tack pins 51 to 54 formed with the cover 21 into the first to fourth tack-pin receiving holes 31 to 34 for temporarily fixing the cover 21 on the base plate 3, and by screwing screws 71 through the first and second screw receiving holes 35 and 36 into the boss portions 55 and 56 which are for screwing and are disposed in the cover 21.

The forming of the tack-pin receiving holes 31 to 34 and the screw receiving holes 35 and 36 are executed by a press-working or drilling discussed hereinafter.

As to the tack-pin receiving holes 31 to 34, as shown in A of FIG. 13, a forming of the prepared holes 401, 401 on the base plate material sheet 301, to which the hard protective coat layer is applied, is first executed.

The prepared hole 401 is formed by using a punch 611 and a die 612 shown in the above-mentioned figure.

Next, as shown in B of FIG. 13, the truncated-cone shaped large hole portion 42, which is gradually compressed in diameter from an end to the other end, is formed by expanding an one end side (the lower surface 301b side of the base plate material sheet 301) of the prepared hole 401 in diameter and by compressing the other end side (the upper surface 301a side of the base plate materiel sheet 301) in diameter.

The large hole portion 42 of the truncated cone shape is formed by using a punch 621 and a die 622 shown in the above-mentioned figure.

The punch 621 is provided with a ring-shaped flange portion 623 which is in contact with the lower surface 301b of the base plate material sheet 301, a cone-shaped oblique surface portion 624 which is integrally formed at the inner side of the flange portion 623 and forms a round surface for the truncated-cone shaped large hole portion 42, and a circular plane portion 625 which is disposed at a tip end portion of the oblique surface portion 624 and forms a bottom surface of the large hole portion 42.

The diameter of the circular plane portion 625 is formed so as to be slightly smaller than that of the prepared hole 401.

By pressing the punch 621 into the prepared hole 401, an end portion of the prepared hole 401 is expanded in diameter, the other end portion is compressed in diameter, and the prepared hole 401 is deformed along the oblique surface portion 624 and the plane surface portion 625.

By pressing the punch 621 until the flange portion 623 is contacted with the lower surface 301b of the base plate material sheet 301, the large hole portion 42, which is of a truncated cone shape and whose depth D is the same as the height H from the flange portion 623 to the plane portion 625, is formed.

The oblique angle θ of the large hole portion 42 is within the range from 3° to 70°.

Next, as shown in C of FIG. 13, the small hole portion 41 is punched at the center portion of the bottom portion of the truncated-cone shaped large hole portion 42.

The small hole portion 41 is formed by using a punch 631 and the die 632 shown in the above-mentioned figure.

The diameter of the punch 631 is formed so as to be smaller than that of the bottom portion of the large hole portion 42.

By punching the center portion of the bottom portion of the large hole portion 42 by means of the punch 631, a peripheral portion of the bottom surface portion is remained as a ring-shaped loose-proofing surface 43.

Next, as shown in D of FIG. 13, a chamfering of an open end side of the small hole portion 41 is executed.

The chamfering is executed by using a punch 641 and a die 642 as shown in the above-mentioned figure.

When the small hole portion 41 is punched, burr 41a (refer to C of FIG. 13) unavoidably generated at the open end side of the small hole portion 41 is removed by the above-mentioned chamfer-working.

Next, as shown in E of FIG. 13, strain in the vicinity of the tack-pin receiving holes 31 to 34 of the upper and lower surface 301a and 301b of the base plate material sheet 301 is removed.

The removing operation of the above-mention strain is executed by using a punch 651 and a die 652 shown in the above-mentioned Figure.

By executing the above-mentioned series of works, the tack-pin receiving holes 31 to 34 are formed in the base plate material sheet 301.

Next, a case for forming the screw receiving holes 35 and 36 will be explained.

A forming of the screw receiving holes 35 and 36 are generally similar to that of the tack-pin receiving holes 31 to 34.

That is, a prepared hole 501 is first formed in the base plate material sheet 301 as shown in A of FIG. 14.

The prepared hole 501 is formed by using a punch 711 and a die 712 shown in the above mentioned figure.

Next, as shown in B of FIG. 14, the cone shaped large hole portion 42, which is gradually compressed in diameter from an end side to the other end side, is formed by expanding the end side (the lower surface 301b side of the base plate material sheet 301) of the prepared hole 501 in diameter and by compressing the other end side (the upper surface 301a side of the base plate material sheet 301) in diameter.

The large hole portion 42 of a cone shape is formed by using a punch 721 and a die 722.

Since a tip end of the punch 721 is formed into a cone shape, by pressing it into the prepared hole 501, the one end side of the prepared hole 501 is expanded in diameter and the other end side is compressed in diameter. Therefore, the prepared hole 501 is deformed into a cone shape along the tip end of the punch 721.

Next, as shown in C of FIG. 14, the small hole portion 41 is punched at a center portion of a bottom portion of a cone shape.

The small hole portion 41 is formed by using a punch 731 and a die 732.

Next, as shown in D of FIG. 14, a chamfering of the open end side of the small hole portion 41 is executed.

The above chamfering is executed by using a punch 741 and a die 742 shown in the above-mentioned figure.

Next, as shown in E of FIG. 14, strain in the vicinity of the screw receiving holes 35 and 36 of the upper and lower surfaces 301a and 301b of the base plate material sheet 301.

The removing operation of the above-mentioned strain is executed by using a punch 751 and a die 752 shown in the above-mentioned figure.

By executing the above-mentioned series of workings, the screw receiving holes 35 and 36 are formed on the base plate material sheet 301.

Although the embodiment has been shown as to a case that the tack-pin receiving holes 31 to 34 and the screw receiving holes 35 and 36 are formed by a press working, these tack-pin receiving holes 31 to 34 and the screw receiving holes 35 and 36 may be formed by a drilling.

While the embodiment has been explained as to the tape cartridge, the present invention may be applied to a tape cartridge in which a magnetic tape is run without using a drive belt.

As explained above, in the tape cartridge producing method of the present invention, since the hard protective coat layer is formed on the base plate material sheet, a base plate, which has been already covered by the hard protective coat layer, is formed by punching the base plate material sheet.

Accordingly, it is possible to eliminate a complicated step that the hard protective coat layer is formed on each base plate after it is conventionally punched from the base plate material sheet, and therefore an improvement in the productivity is promoted.

Since the tape cartridge of the present invention uses a base plate which is punched into a predetermined shape from the sheet shape aluminum-alloy materiel sheet which is covered by the hard protective coat layer, the cost of the base plate is decreased as compared with a case that the sheet-shape aluminum alloy sheet is conventionally punched into a predetermined shape, and the hard protective coat layer is covered on its surface. Therefore, it becomes possible to decrease the cost of the tape cartridge.

Since the side surfaces of the base plate are not covered with the hard protective coat layer, when the tape cartridge is inserted into the recording and reproducing apparatus, no hard protective coat layer is in contact with the recording and reproducing apparatus. Accordingly, there is a merit that the injury of the recording and reproducing apparatus by the base plate is suppressed as compared with the case that the hard protective coat layer is formed at side surfaces of the conventional base plate.

I claim:

1. A producing method of a tape cartridge which executes a driving of a magnetic tape by a drive belt, comprising the steps of:
   a step for forming a hard protective coat layer on a surface of a base plate material sheet;
   a step for punching the base plate material sheet coated by the hard protective coat layer into a predetermined shape of the base plate and forming a hole at a predetermined position on the base plate;
   a step for embedding a plurality of tape guides, roller shafts rotatably supporting a plurality of belt rollers, and reel shafts rotatably supporting a pair of tape reels on the base plate;
   a step for installing roller shafts to the belt rollers, the pair of tape reels to the reel shafts, a tape to the tape reels and a drive belt to the belt rollers; and
   a step for installing a cover to the base plate and screwing down the cover to the base plate through holes.

2. In claim 1, the base plate material sheet is formed by aluminum-alloy and the forming step of the hard protective coat layer is executed by an alumite treatment.

3. In claim 1, the base plate material sheet is formed by aluminum-alloy and the forming step of the hard protective coat layer is executed by coating synthetic resin on a surface of the base plate material sheet.

4. In claim 1, a hole forming to the base plate is executed by a drilling.

5. In claim 1, a hole forming to the base plate is executed by a press working.

6. In claim 5, the press working includes to form a predetermined shaped hole on the base plate by plural number of press steps.

7. In a tape cartridge where a magnetic tape wound around a pair of tape reels is frictionally driven by a drive belt, the tape cartridge comprising:
   a base plate punched into a predetermined shape from a plate aluminum-alloy material whose surface is coated by a hard protective coat layer;
   a pair of tape reels rotatably supported to a pair of reel shafts embedded on the base plate, a magnetic tape being wound around the pair of tape reels and running between the pair of tape reels upon being guided by a plurality of tape guides embedded on the base plate;
   a drive belt runningly guided by a plurality of belt rollers rotatably supported to a plurality of roller shafts embedded on the base plate and frictionally driving the magnetic tape wound around the pair of tape reels;
   a cover installed to the base plate so as to cover the magnetic tape on the base plate; and
   a cap portion disposed at the cover to open and close a head inserted hole so that a magnetic head is contactable with the magnetic tape runningly guided by the tape guides.

8. In a tape cartridge where a magnetic tape wound around a pair of tape reels is frictionally driven by a drive belt, the tape cartridge comprising:

a base plate punched into a predetermined shape from a plate aluminum-alloy material whose surface is coated by a hard protective coat layer and whose side surfaces are exposed as a cut surface;

a pair of tape reels rotatably supported to a pair of reel shafts embedded on the base plate, a magnetic tape being wound around the pair of tape reels, and running between the pair of tape reels upon being runningly guided by a plurality of tape guides embedded on the base plate;

a drive belt runningly guided by a plurality of belt rollers rotatably supported to a plurality of roller shafts embedded on the base plate and frictionally driving the magnetic tape wound around the pair of tape reels;

a cover installed to the base plate so as to cover the magnetic tape on the base plate; and a cap portion disposed at the cover to open and close a head inserted hole so that a magnetic head is contactable with the magnetic tape runningly guided by the tape guides.

9. A producing method of the tape cartridge which executes a driving of a magnetic tape by a drive belt, comprising the steps of:

a step for forming a hard protective coat layer formed by the alumite treatment on a surface of the base plate material sheet made of sheet aluminum alloy;

a step for punching the hard protective coat layer formed base plate material sheet into a predetermined shape and forming a hole at a predetermined position on the base plate;

a step for embedding a plurality of tape guides, roller shafts rotatably supporting a plurality of belt rollers, and reel shafts rotatably supporting a pair of tape reels on the base plate;

a step for installing roller shafts to the belt rollers, the pair of tape reels to the reel shafts, a tape to the tape reels and a drive belt to the belt rollers; and a step for installing a cover on the base plate.

10. In a tape cartridge where a magnetic tape is run between a pair of reels, the tape cartridge comprising:

a base plate punched into a predetermined shape from a plate aluminum-alloy material whose surface is coated by a hard protective coat layer and having a hole at a predetermined position;

a pair of tape reels rotatably supported to a pair of reel shafts embedded on the base plate, a magnetic tape being wound around the pair of tape reels and running between the pair of tape reels upon being runningly guided by a plurality of tape guides embedded on the base plate;

a cover installed to the base plate so as to cover the magnetic tape on the base plate; and a cap portion disposed at the cover to open and close a head inserted hole so that a magnetic head is contactable with the magnetic tape runningly guided by the tape guides.

11. In a tape cartridge where a magnetic tape wound to a pair of tape reels is frictionally driven by a drive belt, the tape cartridge comprising:

a base plate punched into a predetermined shape from a plate aluminum-alloy material whose surface is coated by a hard protective coat layer and having a hole at a predetermined position;

a pair of tape reels rotatably supported to a pair of reel shafts embedded on the base plate, a magnetic tape being wound around the pair of tape reels and running between the pair of tape reels upon being runningly guided by a plurality of tape guides embedded on the base plate;

a drive belt runningly guided by a plurality of belt rollers rotatably supported to a plurality of roller shafts embedded on the base plate and frictionally driving the magnetic tape wound around the pair of tape reels; and a cover fixedly connected to the hole formed on the base plate so as to cover the magnetic tape on the base plate.

* * * * *